(12) United States Patent
Kimura et al.

(10) Patent No.: US 6,448,489 B2
(45) Date of Patent: Sep. 10, 2002

(54) SOLAR GENERATION SYSTEM

(75) Inventors: Fumiya Kimura, Uji; Hirofumi Nakata, Tenri; Tsukasa Takebayashi, Yamatotakada; Hirokazu Kodama, Gojo; Kiyoshi Nishida, Yamatotakada, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/842,923

(22) Filed: Apr. 27, 2001

(30) Foreign Application Priority Data

Apr. 28, 2000 (JP) ........................ 2000-129865
Jul. 31, 2000 (JP) ........................ 2000-230790

(51) Int. Cl.$^7$ ................ H01L 31/04; H01L 31/042
(52) U.S. Cl. ............... 136/244; 136/291; 136/293; 363/70; 363/95; 363/97; 323/906; 320/101
(58) Field of Search .................. 136/244, 291, 136/293; 363/70, 95, 97; 323/906; 320/101

(56) References Cited

U.S. PATENT DOCUMENTS 4,472,641 A 9/1984 Dickey et al. ............... 307/46

FOREIGN PATENT DOCUMENTS

| JP | 59-144327 A | | 8/1984 |
| JP | 8-046231 A | | 2/1996 |
| JP | 9-65657 A | * | 3/1997 |
| JP | 9-261949 A | * | 10/1997 |
| JP | 9-294340 A | | 11/1997 |
| JP | 11-318042 A | | 11/1999 |

* cited by examiner

*Primary Examiner*—Alan Diamond

(57) ABSTRACT

A solar generation system includes a standard solar cell string and a substandard solar cell string. A DC voltage output from the substandard solar cell string is boosted by a booster unit to the level of the DC voltage output from the standard solar cell string, and the DC voltage from the standard solar cell string and the boosted DC voltage are applied to a DC/AC inverter, whereby an AC power is obtained, which is supplied to a utility power supply.

21 Claims, 10 Drawing Sheets

SOLAR GENERATION SYSTEM

BACKGROUND OF THE INVENTION

1. Field of the Invention

The present invention relates to a solar generation system. More specifically, the present invention relates to a solar generation system in which a DC power generated by an independent DC power source such as a solar cell is boosted by a booster unit and converted to an AC voltage by an inverter apparatus to supply power to general AC load for home and office use, or to feed power to existing utility power supply.

2. Description of the Background Art.

A solar cell as a DC power source outputs a DC power when there is high solar insolation. The DC power can be output solely by the solar cell without using other energy source such as a storage battery, and no poisonous substance is discharged. Therefore, the solar cell has been known as a simple and clean energy source.

FIG. 15 is a block diagram showing an example of a conventional solar generation system. For simplicity of the drawing, only two solar cell strings 1a and 1b are shown in the solar generation system. It is needless to say that normally, a larger number of solar cell strings are provided. Generally, one standard solar cell string includes eight or nine solar cell modules (not shown) connected in series with each other.

In the solar generation system, when the DC output power from solar cell strings 1a and 1b is converted to an AC power and interconnected to a utility power supply 4, it is necessary to interpose a power conditioner 3 between the solar cell strings 1a, 1b and the utility power supply 4. When a plurality of solar cell strings 1 are to be interconnected to the utility power supply 4, the plurality of solar cell strings 1 are connected in parallel with the power conditioner 3. Power conditioner 3 includes backflow preventing diodes 50a and 50b, so as to prevent backflow of the current generated by the plurality of solar cell strings 1 connected in parallel. The DC power that has passed through backflow preventing diodes 50a and 50b is converted to an AC power by a DC/AC inverter 60, and supplied through a protection circuit 70 to the utility power supply 4.

Conventionally, it is a common practice for the solar generation system in Japan that a plurality of solar cell strings included therein are placed on a main portion of a roof facing southward, and lines from the solar cell strings are connected to power conditioner 3.

When the solar cell strings are to be placed on the roof of a house, sometimes it is difficult to configure solar cell strings by arranging solar cell modules only that surface of the roof which faces southward and receiving the most of the sunshine. Solar cell modules that are positioned not on the southward surface of the roof may be arranged on the eastward or westward surface of the roof to form the solar cell strings. Sometimes, the solar cell strings are configured by placing small size solar cell modules arranged in the remaining peripheral regions after the solar cell modules are placed on the main portion of the southward surface of the roof. More specifically, sometimes the number of series-connected solar cell modules included in some solar cell strings is different from other solar cell strings. In such a case, different output voltages result from different solar cell strings.

For example, when a standard solar cell string including the standard number of series-connected solar cell modules and a substandard solar cell string including series-connected modules of smaller than the standard number are connected in parallel to the power conditioner 3, only the power from the standard solar cell having the standard output voltage is input to power conditioner 3, and the power from the substandard solar cell string having the substandard output voltage lower than the standard output voltage cannot be fed to the power conditioner 3. Even when the power from the substandard solar cell string is adapted to be fed to power conditioner 3, it is impossible to obtain the maximum output power that is the sum of the maximum power from the standard solar cell string and the maximum power from the substandard solar cell string, as can be seen from FIGS. 16A and 16B.

Unless the power from such a substandard solar cell string can be fed efficiently to power conditioner 3, the area occupied by the substandard solar cell string would be wasted.

In the graphs of FIGS. 16A and 16B, the abscissa represents output voltage V and the ordinate represents output power P. In the graph of FIG. 16A, the curve S represents an output power from the standard solar cell string, while the curve N represents the output power from the substandard solar cell string. More specifically, the standard solar cell string has the maximum output power Ps, while the substandard solar cell string has the maximum output power Pn. The output power that is the sum of these two output powers is as shown in FIG. 16B. The maximum output power Psn of the output power curve (S+N) shown in FIG. 16B is considerably smaller than the sum (Ps+Pn) of the maximum output powers Ps and Pn shown in FIG. 16A. The reason for this is that the voltage position for the maximum output power Ps of the standard solar cell string 1a is different from the voltage position of the maximum output power Pn from the substandard solar cell string 1b.

In view of the foregoing, a possible solution is to adjust output voltages from the plurality of solar cell strings. For this purpose, an impedance may be interposed between standard solar cell string 1a and power conditioner 3. This method, however, is not practical, as the power is lost by the impedance. Another possibility is to use MG (Motor Generator) method to change the DC voltage. This method, however, is not preferable as mechanical vibration or noise is generated and the motor generator itself is bulky.

In the solar cell generation system disclosed in Japanese Patent Laying-Open No. 8-46231, boosted type DC-DC converter 80b having maximum power point tracking function are incorporated in each solar cell module or in each substandard solar cell string, as shown in FIG. 17. Such a solar generation system is disadvantageous in that the circuit structure becomes complicated and in that voltage adjustment for the solar generation system as a whole must be performed in the initial design stage of each solar cell string having different output voltages.

In Japanese Patent Laying-Open No. 8-46231, an isolation transformer is connected. This increases the weight of the system and lowers power conversion efficiency. In case of a malfunction of the boosting circuit caused by a surge, it will trouble a repair person to climb on the roof and to exchange the solar cell module.

SUMMARY OF THE INVENTION

Therefore, a main object of the present invention is to enable interconnection of a plurality of solar cell strings having different output voltages to a utility power supply in a simple manner, and to enable efficient use of the maximum output power of the solar cell strings.

Briefly stated, the present invention relates to a solar generation system in which a DC voltage output from a solar cell is boosted, and the boosted DC voltage is supplied to an inverter apparatus converting the DC voltage to an AC power, including a standard solar cell string having a standard number of solar cell modules connected in series, a substandard solar cell string having solar cell modules smaller in number than the standard number connected in series, a boosting circuit for boosting the DC voltage output from the substandard solar cell string to a DC voltage output from the standard solar cell string, and an input connecting circuit for supplying the DC voltage boosted by the boosting circuit and the DC voltage output from the standard solar cell string to the inverter apparatus.

Therefore, according to the present invention, as the DC voltage from the substandard solar cell string is increased to the DC voltage of the standard solar cell string, interconnection to the utility power supply is possible in a simple manner, and the sum of the maximum outputs from respective solar cell strings can be used as the final maximum output power.

More preferably, the boosting circuit boosts the DC voltage output from the substandard solar cell string at a boosting voltage ratio determined by the ratio between the standard number and the number smaller than the standard number.

More preferably, the system includes a switch for manually switching the boosting voltage ratio of the boosting circuit.

More preferably, the system includes a control circuit for controlling the boosting circuit by setting the boosting voltage ratio by pulse width modulation.

More preferably, a plurality of substandard solar cell strings are provided, and boosting circuits are provided for respective ones of the plurality of substandard solar cell strings, for boosting the DC voltage output from the corresponding one of the substandard solar cell strings.

More preferably, the boosting circuit is provided detachably between the substandard solar cell strings and the input connecting circuit.

More preferably, a power supply voltage is supplied to the boosting circuit from the substandard solar cell string.

More preferably, the input connecting circuit includes a backflow preventing circuit for preventing backflow of the current from the side of the boosting circuit to the substandard solar cell string, an input connecting/disconnecting circuit for connecting or disconnecting the substandard solar cell string and the boosting circuit, and a lightning surge preventing circuit for preventing entrance of lightning surge from the substandard solar cell string to the side of the boosting circuit.

More preferably, the system includes a voltage control circuit performing control to keep constant the boosting ratio, when the output voltage of the boosting circuit is lower than an upper limit set voltage.

More preferably, when the output voltage of the boosting circuit is higher than the upper limit set voltage, the voltage control circuit performs control to keep constant the upper limit voltage.

More preferably, the voltage control circuit changes the boosting ratio.

More preferably, the input connecting circuit includes a trip signal generating circuit generating a trip signal when the output voltage attains to an over voltage, and a breaker opening the connection between the substandard solar cell string and the input connecting circuit in response to the trip signal from the trip signal generating circuit.

More preferably, the trip signal generating circuit opens connection between the substandard solar cell string and the input connecting circuit by means of the breaker, by generating the trip signal, when there is a short-circuit in the boosting circuit.

More preferably, the trip signal generating circuit outputs a trip signal when it is detected that a short-circuit current flows in the boosting circuit and the temperature is increased.

More preferably, the trip signal generating circuit generates the trip signal when the output voltage of the boosting circuit exceeds a predetermined input voltage range.

More preferably, the boosting circuit includes a fuse for intercepting the short-circuit current from an output side.

More preferably, the fuse is connected in series with the boosting circuit, and opens the path of the short-circuit current, in accordance with the magnitude of the short-circuit current.

More preferably, the system includes a box placed outdoors, housing at least the input connecting circuit, and the box includes a drainage to guide rain water to a lower portion when rain water enters, and an outlet opening for discharging the rain water guided to the lower portion.

More preferably, a radiator is provided outside the box, for generation of heat from the boosting circuit and the backflow preventing circuit.

More preferably, the system includes a metal plate covering the radiator of the box and supporting the box on a wall surface.

More preferably, the box has a lid that can be opened/closed, and the input connecting circuit is operated with the lid opened.

More preferably, the system includes an indicator which is turned on when the boosting circuit is driven, and which is turned off in response to the stop of operation of the boosting circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
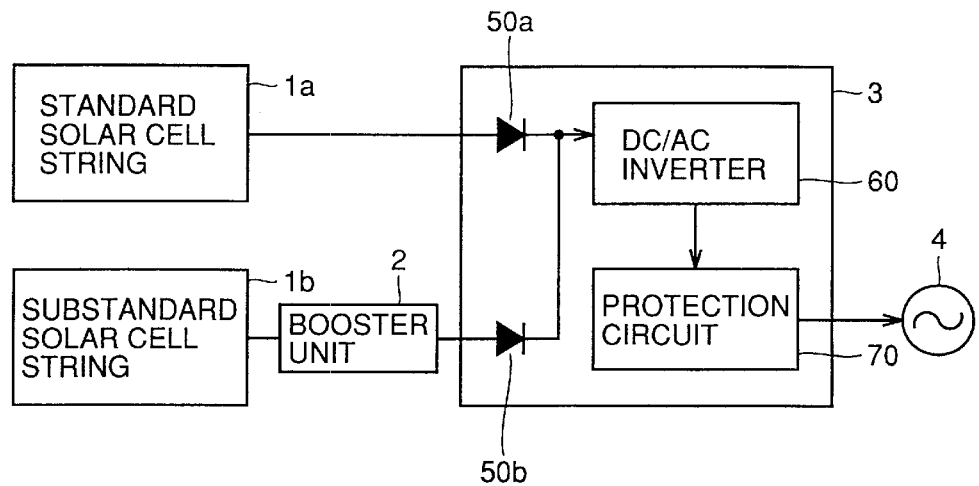
FIG. 1 is a schematic block diagram representing the solar generation system in accordance with an embodiment of the present invention.

FIG. 1 is a block diagram of the solar generation system in accordance with an embodiment of the present invention. In the solar generation system, for simplicity of the drawing, only one standard solar cell string 1a and one substandard solar cell string 1b are shown. It is needless to say that there may be larger number of solar cell strings. Generally, standard solar cell string 1a includes eight or nine solar cell modules (not shown). The substandard solar cell string 1b includes solar cell module smaller in number than the standard solar cell string 1a.

The output power of standard solar cell string 1a is supplied to a DC/AC inverter 60 through a backflow preventing diode 50a included in power conditioner 3. The output power of substandard solar cell string 1b is supplied to DC/AC inverter 60 through a booster unit 2 and a backflow preventing diode 50b. In power conditioner 3, output powers from the plurality of backflow preventing diodes 50a are put together and supplied to DC/AC inverter 60. The AC output power from DC/AC inverter is supplied to a utility power supply 4 through a protection circuit 70.

In the solar generation system such as shown in FIG. 1, the output voltage of substandard solar cell string 1b is made equal to the output voltage of standard solar cell string 1a by booster unit 2. Therefore, as can be seen from FIGS. 2A and 2B, the maximum output power that is the sum of the maximum output power of standard solar cell string 1a and the output power from substandard solar cell string 1b is supplied to utility power supply 4.

Figure 2A:
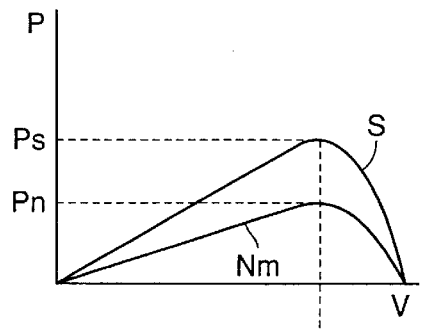
FIGS. 2A and 2B are graphs representing output powers of a standard solar cell string and a substandard solar cell string and an output power provided when the output powers are connected in parallel.
Figure 2B:
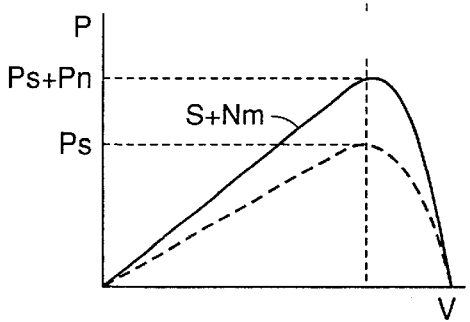

Referring to FIGS. 2A and 2B, the abscissa represents an output voltage V and the ordinate represents the output power P. The curve S represents the output power from standard solar cell string 1a, and the curve Nm represents the output power after the output power of substandard solar cell string 1b is boosted by booster unit 2. As can be seen from the graph of FIG. 2B, the voltage position of the maximum output Pn of substandard solar cell string 1a boosted by booster unit 2 is the same as that voltage position of maximum output power Ps from the standard solar cell string. Therefore, when the output powers S and Nm are added, the output power curve will be S+Nm as shown in the graph of FIG. 2B, and thus, maximum output power (Ps+Pn) can be obtained.

In this manner, by the solar generation system in accordance with one embodiment of the present invention, by a simple method of providing a booster unit 2 between the substandard solar cell string 1b and power conditioner 3, the maximum output power (Ps+Pn) that is the sum of the maximum output power Ps from the standard solar cell string 1a and the maximum output power Pn from the substandard solar cell string 1b can be supplied to the utility power supply. Further, the booster unit 2 is easily detachable, and therefore, when the substandard solar cell string 1b is changed to a standard solar cell string 1a, the unit can be detached.

Figure 3:
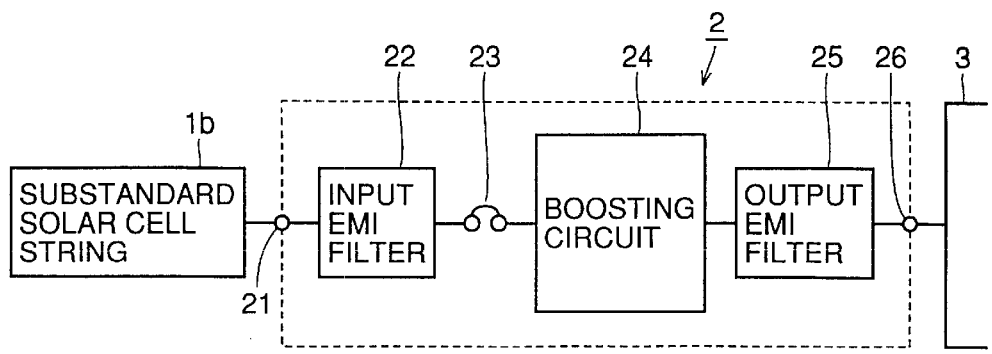
FIG. 3 is a block diagram showing a specific example of the booster unit included in the solar generation system shown in FIG. 1.

FIG. 3 is a schematic block diagram showing a specific example of booster unit 2 shown in FIG. 1. Booster unit 2 includes, in the order from an input terminal 21 at an input portion, an input EMI (Electro Magnetic Interference) filter 22, a breaker 23, a boosting circuit 24, an output EMI filter 25 and an output terminal 26. Output terminal 26 is connected to an input terminal of power conditioner 3.

Figure 17:
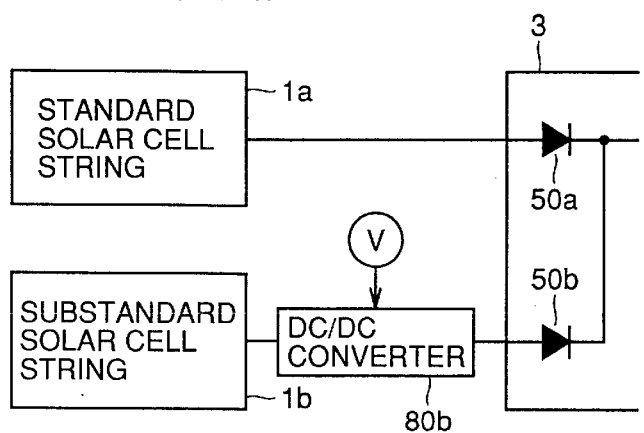
FIG. 17 is a block diagram illustrating a method of detecting an output voltage of a standard solar cell string and generating a boosting voltage ratio corresponding thereto in the booster unit.

The boosting ratio of boosting circuit 24 may be determined by the ratio of series-connected solar cell modules in the standard solar cell string 1a and the substandard solar cell string 1b. Thus, the circuit configuration of boosting circuit 24 in booster unit 2 is very simple. Further, a complicated control such as shown in FIG. 17, in which a DC/DC converter 80b adjusts output voltage of substandard solar cell string 1b using the output voltage of standard solar cell string 1a as a reference voltage so that the output voltage of substandard solar cell string 1b is made equal to the output voltage of standard solar cell string 1a, is unnecessary.

Figure 4:
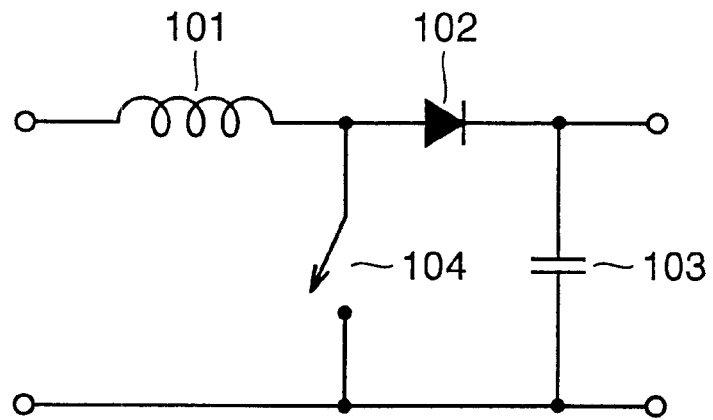
FIG. 4 is a circuit diagram showing a specific example of the boosting circuit included in the booster unit.

FIG. 4 is a circuit diagram showing a specific example of boosting circuit 24 included in booster unit 2. In boosting circuit 24, a reactor 101 and a diode 102 are connected in series, a capacitor 103 is connected between the cathode of diode 102 and the ground, and a switching device 104 is connected between the anode of diode 102 and the ground. As switching device 104, a BJT (Bipolar Junction Transistor), an FET (Field Effect Transistor), an IGBT (Insulated Gate Bipolar Transistor) or a GTO (Gate Turn Off thyrister) may be used.

When switching device 104 is on, in the boosting circuit 24, energy is stored in the reactor as current flows to reactor 101. When the switching device 104 is turned off, the energy stored in reactor 101 is changed to a current, which charges capacitor 103 through diode 102. When switching device 104 is again turned on, energy is stored in reactor 101, and when switching device 104 is turned off, the energy of reactor 101 is changed to a current, and a voltage derived from the current is superposed on the voltage charged to the capacitor 103, whereby the boosting is attained.

Figure 5:
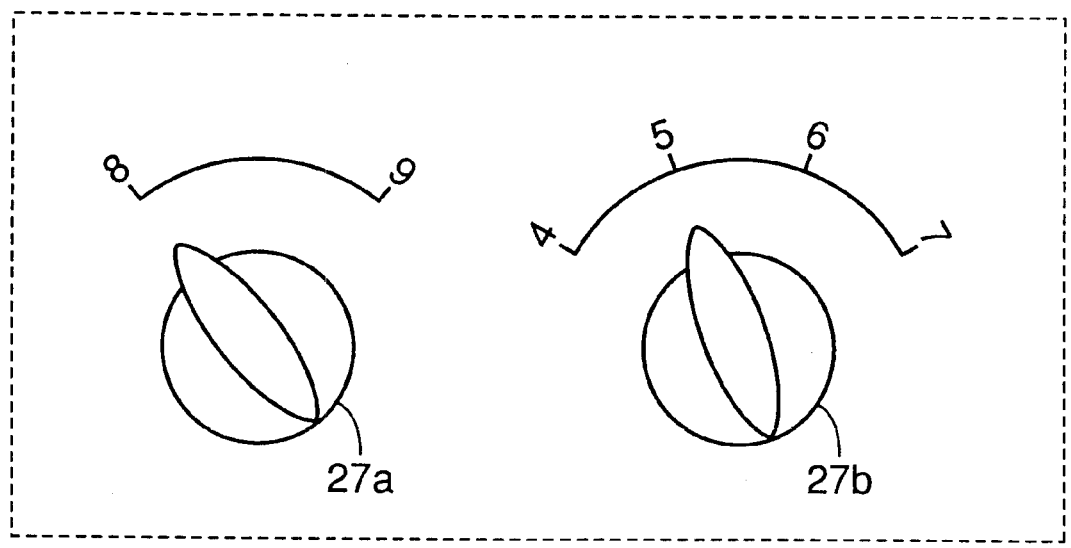
FIG. 5 shows a connection switch for manually determining the boosting voltage ratio in the booster unit.

FIG. 5 schematically shows switches for determining the boosting ratio. In this example, the boosting ratio can be determined by manually switching the switches. More specifically, solar cell modules of the same type having the same characteristics are generally used in the solar generation system. Therefore, the voltage ratio between the standard solar cell string 1a and the substandard solar cell string 1b, that is, the boosting ratio, can be determined by a simple fixed integer ratio such as 8:4 to 8:7 or 9:4 to 9:7.

Therefore, when the boosting voltage ratio is to be set, first, the number $n_1$ (8 or 9) of the solar cell modules included in standard solar cell string 1a is set by a switch 27a, and then, the number $n_2$ (4 to 7) of the solar cell modules included in the substandard solar cell string 1b is set by a switch 27b. By manually operating these two switches 27a and 27b, the output voltage of booster unit 2 is set to $n_1/n_2$ times the output voltage of substandard solar cell string 1b connected thereto, and hence the output voltage becomes equal to the output voltage of standard serially connected solar cell string 1a.

Figure 6:
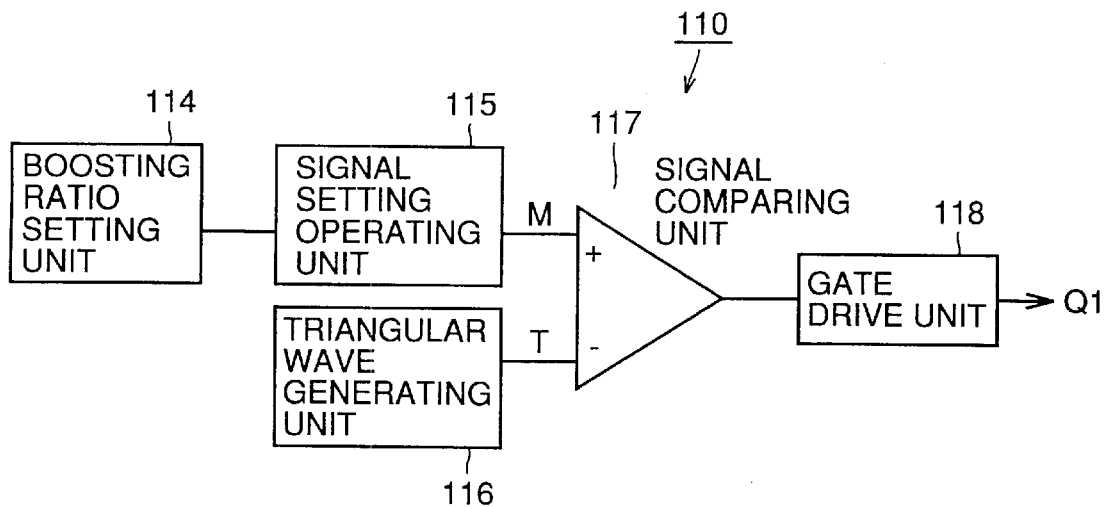
FIG. 6 is a block diagram representing a circuit for controlling the switching device in the boosting circuit.
Figure 7A:
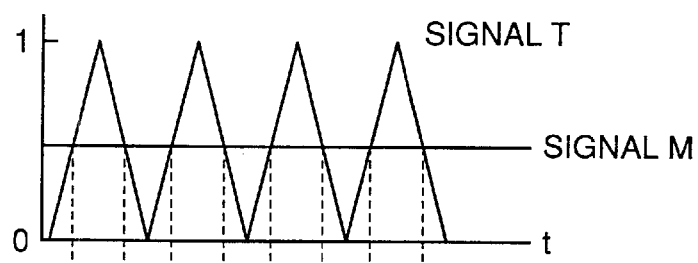
FIGS. 7A and 7B are graphs representing comparison between the triangular wave and the setting signal, and the gate pulse signal driving the device.
Figure 7B:
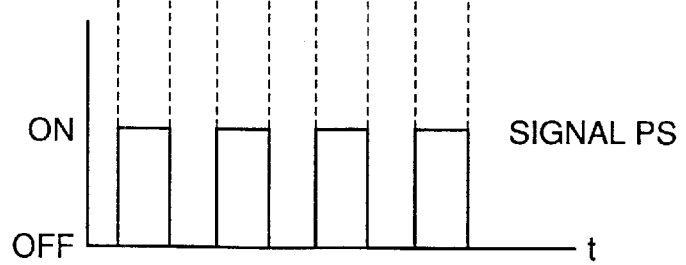

FIG. 6 is a block diagram representing a control circuit used when boosting circuit 24 is driven by PWM (Pulse Width Modulation) control, and FIGS. 7A and 7B are waveform diagrams at various portions of FIG. 6.

For the boosting voltage ratio set by the boosting ratio setting unit 114 including switches 27a and 27b shown in FIG. 5, a signal set value is calculated in accordance with the following equation (1), by a signal setting operation unit 115.

$$\text{(Signal Setting Value)} = \text{(set value of switch 27b)/(set value of switch 27a)} \quad (1)$$

Referring to FIG. 7A, the signal set value M resulting from the operation by signal setting operation unit 115 and a triangular wave T having an amplitude value of 0 to 1 oscillated by a triangular wave generating unit 116 are compared by a signal comparing unit 117. When the signal set value M is smaller than the triangular wave T, signal comparing unit 117 outputs a gate ON level, and when the signal set value M is larger than the triangular wave T, the comparing unit outputs a gate OFF level. As a result, signal comparing unit 117 provides the pulse signal PS shown in FIG. 7B. The ratio between the period of pulse signal PS and the pulse width time (duty ratio) is represented by the following equation (2).

$$\text{(Duty Ratio)} = 1 - \text{(signal set value)} \quad (2)$$

The pulse signal PS is input to a gate drive unit 118 for boosting circuit 24, and gate drive unit 118 drives switching device 104 shown in FIG. 4. By utilizing such a method of boosting under PWM control, the boosting circuit 24 can be realized in a simple structure.

In order to drive booster unit 2, a power source therefor is necessary. When a battery that can provide output constantly such as a dry battery or a storage battery is used, booster unit will be in operation night and day, if there is no power switch provided. When the battery runs down, battery exchange is necessary. Further, in order to obtain power for booster unit 2 from utility power supply 4, a separate interconnection becomes necessary. When the energy from the substandard solar cell string 1b connected to booster unit 2 itself is used as the driving energy, booster unit will operate only in the day time when substandard solar cell string 1b is in operation, and the operation is automatically stopped at night. Further, the solar cell never runs down, and therefore, unlike a dry battery or a storage battery that is drained, exchange is unnecessary. Further, interconnection from an external power source is unnecessary.

As described above, according to the embodiment, in a solar generation system including standard solar cell string 1a as well as substandard solar cell string 1b, interconnection to the utility power supply can be established in a simple manner, and a sum of the maximum outputs from respective solar cell strings can eventually be utilized as the maximum output power.

Figure 8:
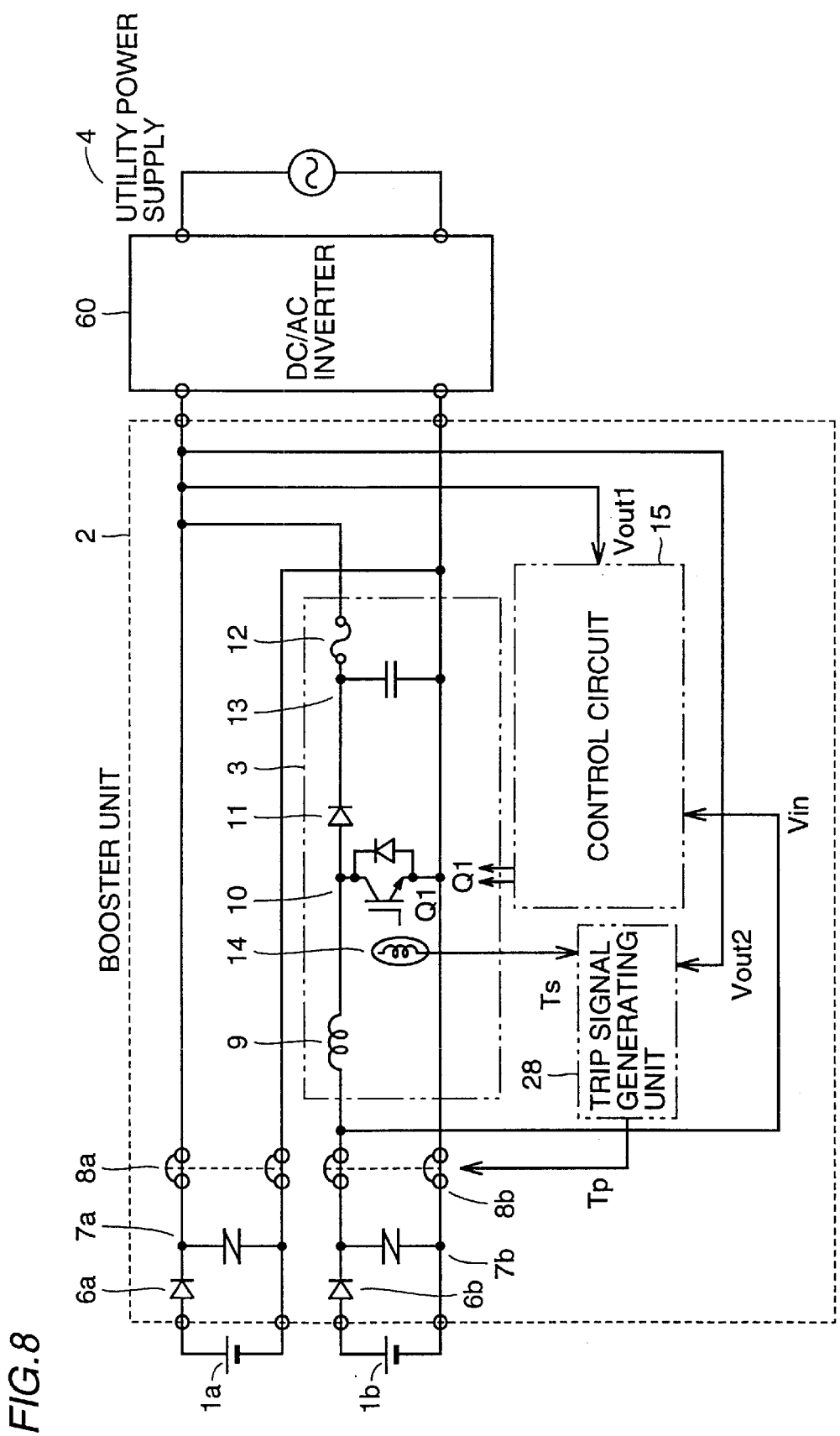
FIG. 8 is a block diagram of the booster unit in accordance with one embodiment of the present invention.

FIG. 8 shows a solar generation system including the booster unit and the inverter apparatus in accordance with another embodiment of the present invention.

Referring to FIG. 8, standard solar cell string 1a and substandard solar cell string 1b are connected to booster unit, and respective output powers are input to booster unit 2. Booster unit 2 is further connected to DC/AC inverter 60, and DC/AC inverter 60 converts the DC power output from booster unit 2 to an AC power having the same phase and the frequency 50/60 Hz as the utility power supply 4, and supplies it to the utility power supply 4.

Booster unit 2 includes a boosting apparatus 3, a control circuit 15, a trip signal generating unit 28, backflow preventing diodes 6a, 6b, lightning surge absorbers 7a, 7b and input breakers 8a and 8b.

Backflow preventing diodes 6a and 6b prevent backflow of the DC current from booster unit 2 to solar cell strings 1a and 1b. Lightning surge absorbers 7a and 7b prevent entrance of lightning surge from solar cell strings 1a, 1b to booster unit 2. Input breakers 8a and 8b connect and disconnect solar cell string 1a, 1b, to and from booster unit 2.

Boosting apparatus 3 includes a reactor 9, a switching device 10, a diode 11, a capacitor 13, a fuse 12 and a temperature sensor 14. Reactor 9 stores and discharges energy of the DC power input to booster unit 2. Switching device 10 switches on/off, in accordance with a high frequency control output from control circuit 15. Capacitor 13 stores the energy discharged from reactor 9 when switching device 10 turns off. Fuse 12 opens the circuit when a current higher than a set value flows. Temperature sensor 14 monitors the temperature of switching device 10, and provides its output to trip signal generating unit 28. An output voltage Vout of booster unit 2 and a temperature signal Ts of temperature sensor 11 are applied to trip signal generating unit 28, and when the output voltage Vout attains a voltage higher than a voltage range, trip signal generating unit 28 outputs a trip signal Tp for tripping input breakers 8a and 8b.

Figure 9:
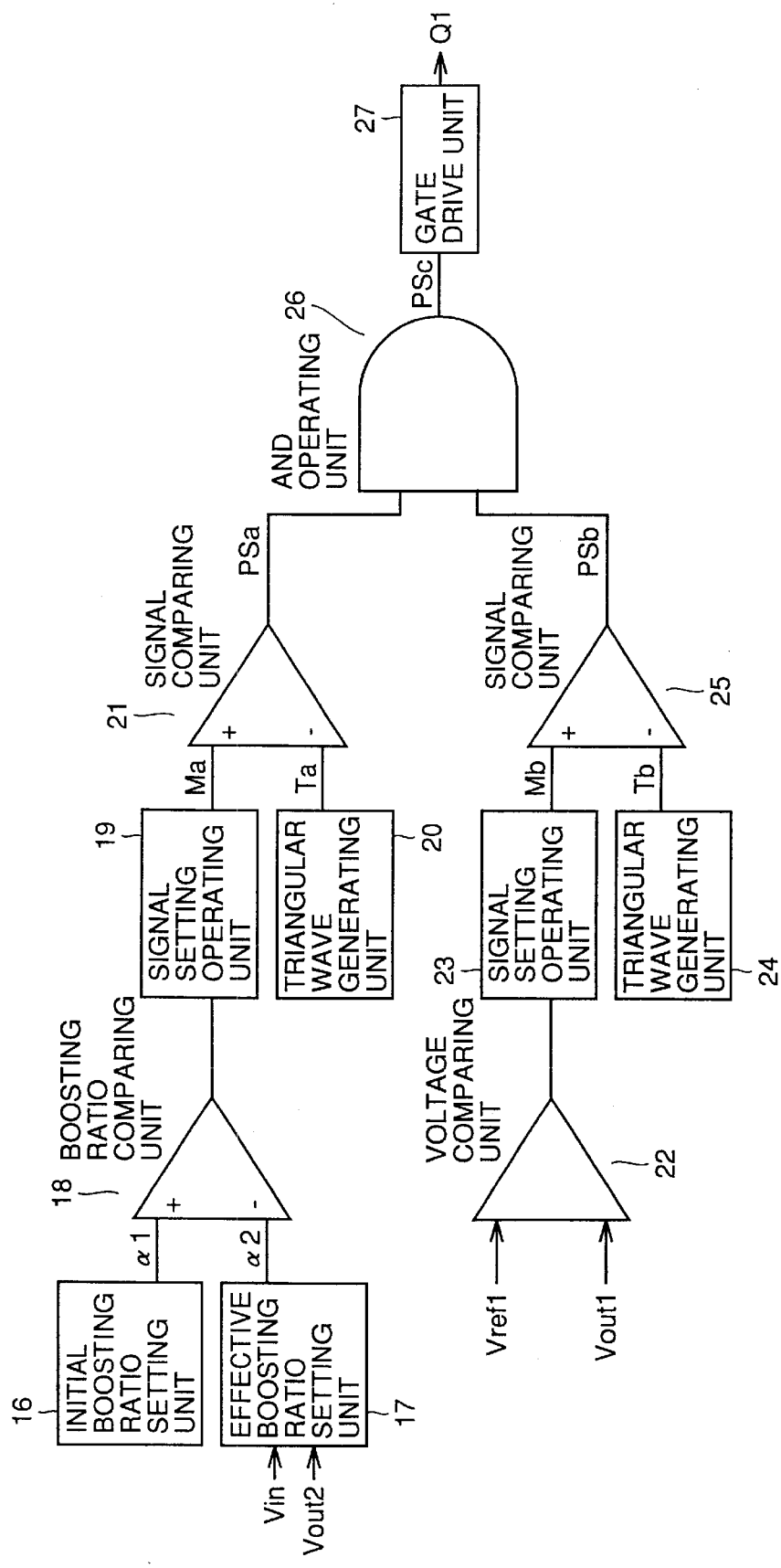
FIG. 9 is a block diagram of a control circuit in the booster unit shown in FIG. 1.

FIG. 9 is a specific block diagram of control circuit 15 shown in FIG. 8. Referring to FIG. 9, control circuit 15 includes an initial boosting ratio setting unit 16, an effective boosting ratio setting unit 17, a boosting ratio comparing unit 18, a signal setting operation unit 19, a triangular wave generating unit 20, a signal comparing unit 21, a voltage comparing unit 22, a signal setting operation unit 23, a triangular wave generating unit 24, a signal comparing unit 25, an AND operating unit 26 and a gate drive unit 27.

Initial boosting ratio setting unit 16 sets the ratio between the number n1 of the solar cell modules included in standard solar cell string 1a and the number n2 of the solar cell modules included in substandard solar cell string 1b, that is, boosting ratio α1 (=n1/n2). Effective boosting ratio setting unit 17 sets for every sampling, the effective boosting ratio α2 (=Vout1/Vin), from the input voltage Vin to the booster unit 2 and the output voltage Vout1.

Initial boosting ratio α1 obtained from initial boosting ratio setting unit 16 and the effective boosting ratio (α2 obtained from effective boosting ratio setting unit 17 are compared by boosting ratio comparing unit 18, an error therebetween is amplified and output to signal setting operation unit 19.

Figure 10A:
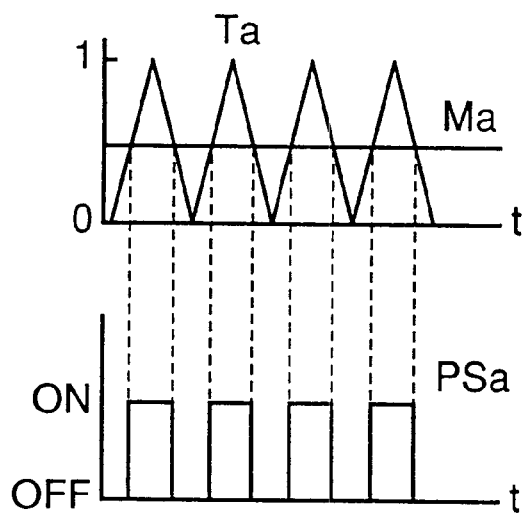
FIGS. 10A to 10C are waveform diagrams of various portions of the control circuit.
Figure 10B:
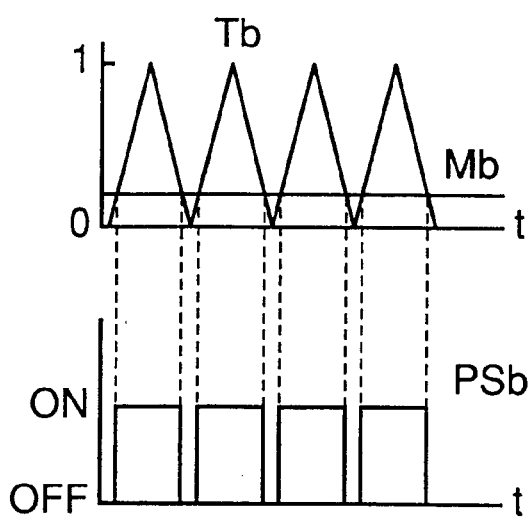

FIGS. 10A to 10C and 11A to 11F are waveform diagrams of the control circuit in the booster unit shown in FIG. 9. Referring to FIG. 10A, the signal set value Ma obtained by signal setting operation unit 19 and the triangular wave Ta having the amplitude value from 0 to 1 generated by triangular wave generating unit 20 are compared by the signal comparing unit 21, and when the signal set value Ma is larger than the triangular wave Ta, signal comparing unit 21 performs PWM control, providing gate OFF level. As a result, signal comparing unit 21 provides a pulse signal PSa.

Further, a preset voltage Vref1 and the output voltage Vout1 of booster unit 2 are input at every sampling and compared by voltage comparing unit 22. The result is output to signal setting operation unit 23. Further, referring to FIG. 10, a signal set value Mb obtained at signal setting operation unit 23 and a triangular wave Tb having an amplitude value from 0 to 1 generated by triangular wave generating unit 24 are compared by signal comparing unit 25, and when the signal set value Mb is larger than the triangular wave Tb, signal comparing unit 25 performs PWM control to output the gate OFF level.

Figure 10C:
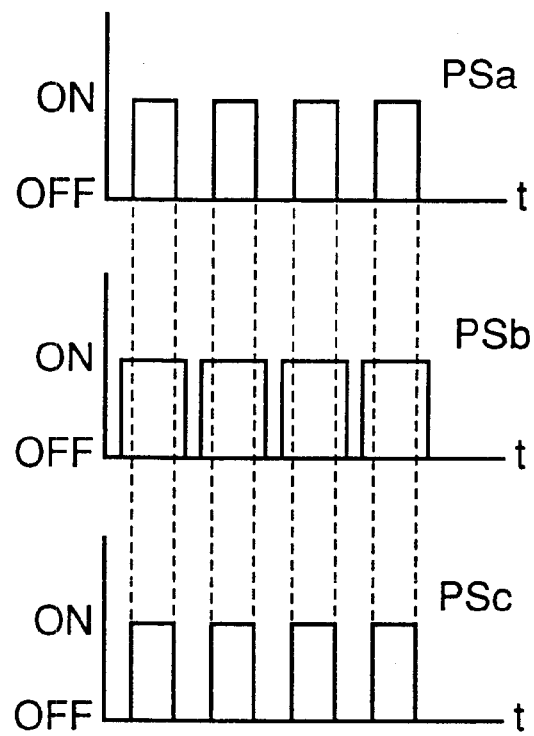

As a result, signal comparing unit 5 provides a pulse signal PSb. The pulse signals PSa and PSb are input to AND operating unit 26, and an AND operation is performed. As a result, a pulse signal PSc is generated as shown in FIG. 10C. The pulse signal PSc is input to gate drive unit 27 for switching device 10.

The operation of booster unit 2 structured as above is as follow. As already described, booster unit 2 boosts the input voltage based on the boosting ratio α(=n1/n2) determined from the number n1 of the solar cell module in the standard solar cell string 1a and the number n2 of solar cell modules in substandard solar cell string 1b, and an output voltage therefrom is supplied to DC/AC inverter 60. When the output voltage of booster unit 2 is within the tolerable input voltage range of DC/AC inverter 60, booster unit 2 performs such a control that makes constant the boosting ratio. More specifically, control circuit 15 outputs the pulse signal PSa (FIG. 10A) providing the gate OFF level, based on the triangular wave Ta and the signal set value Ma obtained from initial boosting ratio α1 and the effective boosting ratio α2, to AND operating unit 26.

Figure 11A:
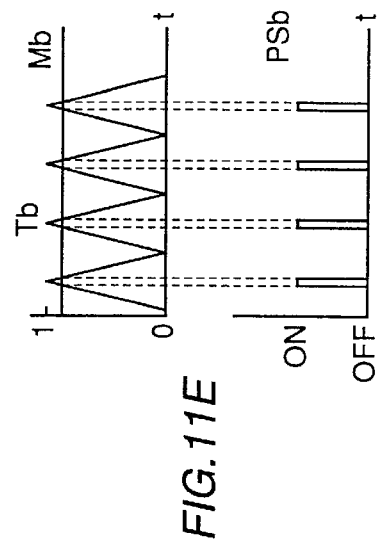
FIGS. 11A to 11F are waveform diagrams of various portions of the control circuit.
Figure 11B:
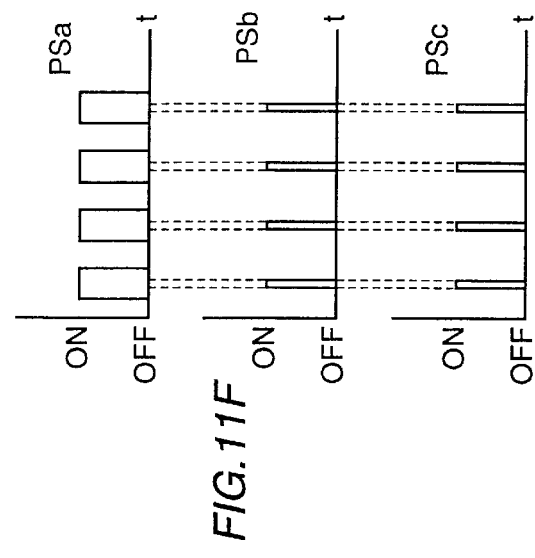
Figure 11C:
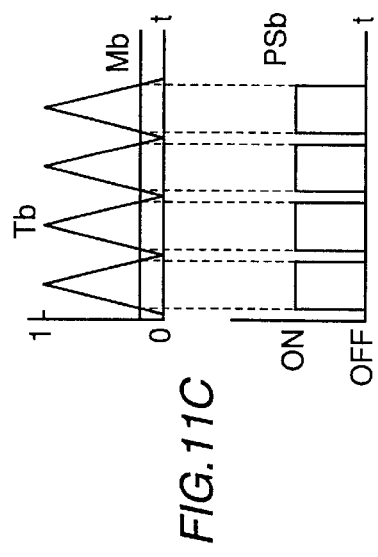

At this time, as the output voltage Vout1 of booster unit 2 is within the input voltage range Vref1 of DC/AC inverter 60 (Vout1<Vref1), voltage comparing unit 22 has the signal set value Mb having the amplitude value of 0 as an output of signal setting operation unit 23 input to signal comparing unit 25. Then, PWM control based on the triangular wave Tb and signal set value Mb takes place in signal comparing unit 25, and a pulse signal PSb having the pulse width of 1 such as shown in FIG. 11A is output to AND operating unit 26. As the pulse signal PSb has the pulse width 1, a pulse signal PSc which is similar to pulse signal PSa is output to gate drive unit 27 as a result of AND operation, as shown in FIG. 11B. At this time, the target of control is to make constant the boosting ratio.

When the DC/AC inverter 60 connected to the output side of booster unit 2 is not in operation, there is no load on booster unit 2, and therefore, when booster unit 2 performs the boosting operation, the output voltage of booster unit 2 exceeds the tolerable input voltage range of DC/AC inverter 60. Therefore, when the output voltage of booster unit 2 is higher than the tolerable input voltage range of DC/AC inverter 60, booster unit 2 performs constant voltage control in which the boosting ratio αis varied to be smaller so that the output voltage of booster unit 2 is within the tolerable input voltage range of DC/AC inverter 60.

More specifically, as the output voltage Vout1 of booster unit 2 is higher than the input voltage range Vref1 of DC/AC inverter 60 (Vout 1>Vref1), in the control circuit 15, voltage comparing unit 22 has the signal setting operation unit 23 provide the signal set value Mb having the amplitude value not larger than 1 but larger than 0 (for example 0.1) to signal comparing unit 25. Signal comparing unit 25 compares the triangular wave Tb with the signal set value Mb, performs PWM control, and the pulse signal PSb shown in FIG. 11D is output to AND operating unit 26.

Figure 11D:
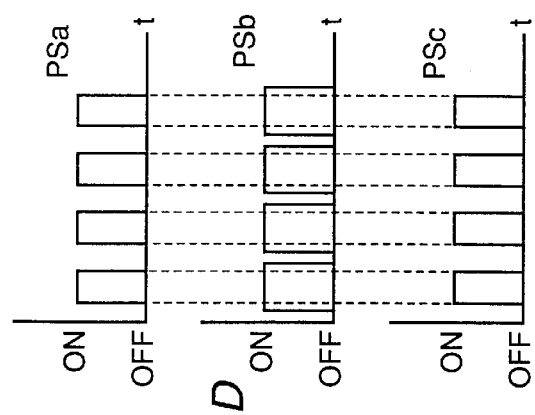
Figure 11E:
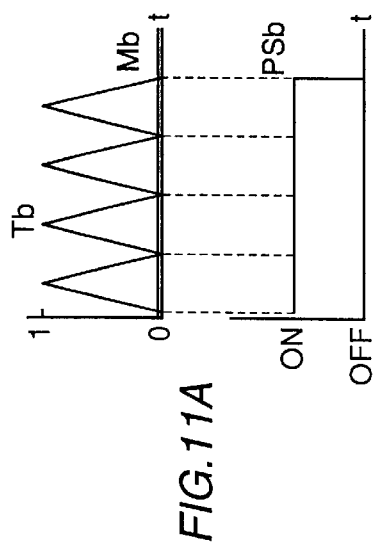

At this time, if the pulse width of pulse signal PSb is larger than the pulse signal PSa as shown in FIG. 11D, a pulse signal PSc similar to pulse signal PSa is output to gate drive unit 27 as a result of the AND operation. In this state, the output voltage Vout1 of booster unit 2 is higher than the input voltage range Vref1 of DC/AC inverter 60 (Vout1>Vref1), voltage comparing unit 22 has the signal setting operation unit 23 input the signal set value Mb of the value larger than the last amplitude value, to signal comparing unit 25. The triangular wave Tb and the signal set value Mb are compared by signal comparing unit 25 and PWM control is performed. In this manner, pulse signal PSb is input from signal comparing unit 25 to AND operating unit 26.

Figure 11F:
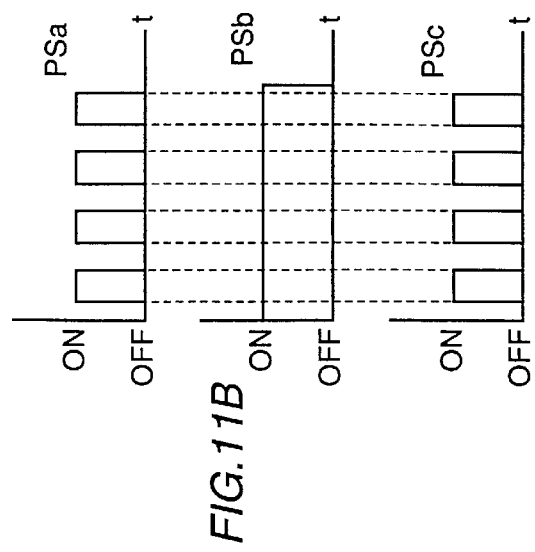

As a result, a pulse signal PSb having such a pulse width as shown in FIG. 11D is input to the AND operating unit 26, and when the pulse width of pulse signal PSb is smaller than the pulse signal PSa, AND operating unit 26 outputs a pulse signal PSc similar to the pulse signal PSb to gate drive unit 27 as shown in FIG. 11F. As a result, the control is switched from the control to keep boosting ratio constant to the control in which the boosting ratio αis made smaller, that is, to a constant voltage control by which the output voltage of booster unit 2 is set within the tolerable input voltage range of DC/AC inverter 60. At this time, control target is to make constant the output voltage.

When the output voltage exceeds the input voltage range of DC/AC inverter 60 while the booster unit 2 performs the constant voltage control, that is, even when the boosting ratio α is made smaller and an overvoltage state occurs as it is impossible to further reduce the boosting ratio α, the input breaker 8b is tripped, so that a line to the solar cell string 1b is opened. More specifically, trip signal generating unit 28 monitors the output voltage Vout2 as shown in FIG. 8. When the output voltage Vout2 becomes larger than a preset tolerable input voltage range Vref2 of DC/AC inverter 60 (Vref1<Vref2) (Vout2>Vref2), a trip signal Tp is sent from trip signal generating unit 28 to input breaker 8b, and input breaker 8b is tripped, opening the path to the solar cell string 1b.

When switching device 10 is short-circuited, short-circuit current flows between solar cell string 1b and switching device 10. When the short-circuit current flows, the temperature of switching device 10 increases. If the short-circuit current flows continuously, the temperature of switching device 10 will be much increased, possible resulting in malfunction of booster unit 2. Therefore, trip signal generating unit 28 monitors the temperature Ts of switching device 10 through a temperature sensor 29 attached to switching device 10. When a set temperature is reached, trip signal generating unit 28 transmits an input breaker trip signal Tp to trip input breaker 8b, so that the path to the solar cell string 1b is opened. In this manner, continuous flow of the short-circuit can be intercepted.

When a short-circuit current flows on the output side of booster unit 2, that is, to the side of DC/AC inverter 60, malfunction of switching device 10 or the like is possible. Therefore, fuse 12 provided in the preceding stage of capacitor 13 in boosting apparatus 3 is blown off, preventing continuous flow of the short-circuit current.

As switching device 10 of booster unit 2 shown in FIG. 8, an FET (Field Effect Transistor), an IGBT (Insulated-Gate Bipolar Transistor) or the like may be used. Control circuit 15 may be implemented by an analog circuit or a digital circuit.

Figure 12A:
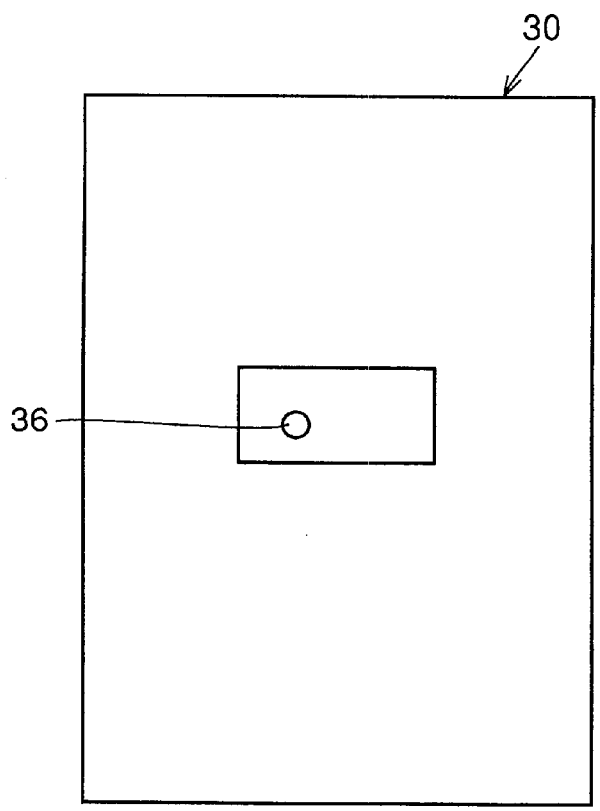
FIGS. 12A to 12C show the appearance of the box housing the booster unit in accordance with one embodiment of the present invention.
Figure 12B:
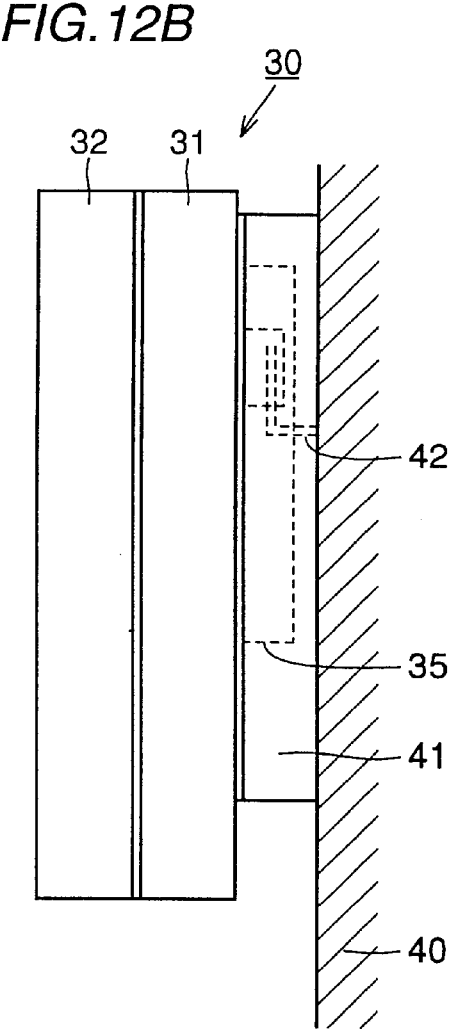
Figure 12C:
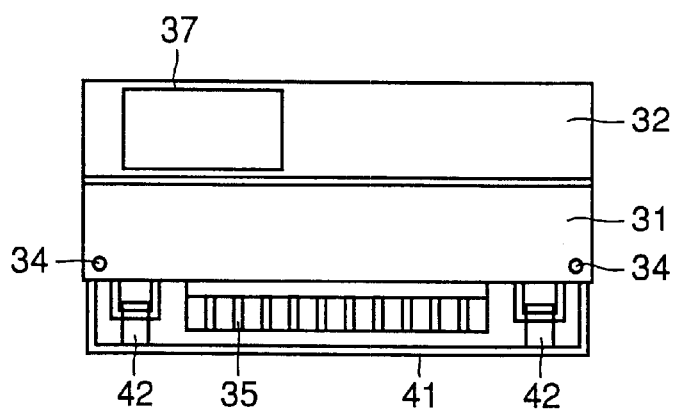
Figure 13A:
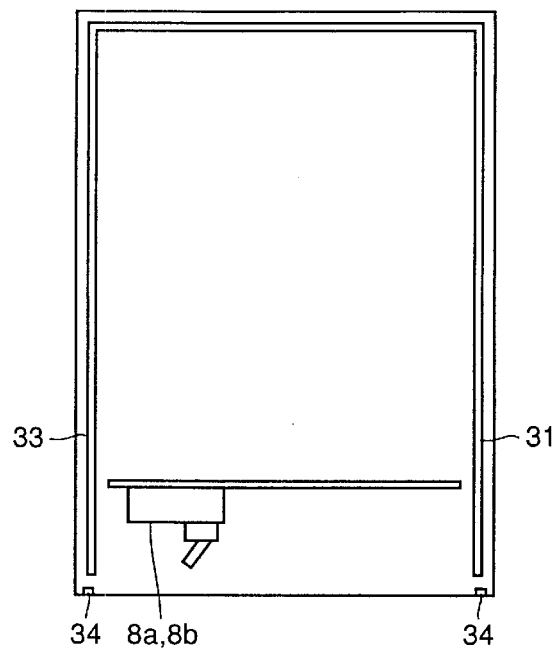
FIGS. 13A and 13B show internal structure of the box shown in FIGS. 12A to 12C.
Figure 13B:
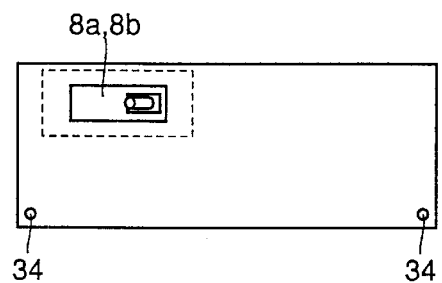
Figure 14A:
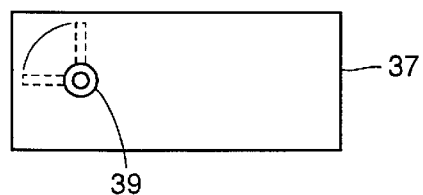
FIGS. 14A and 14B represent the structure of the lid of the box shown in FIGS. 12A to 12C.
Figure 14B:
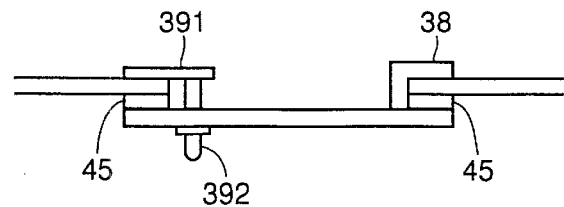
Figure 15:
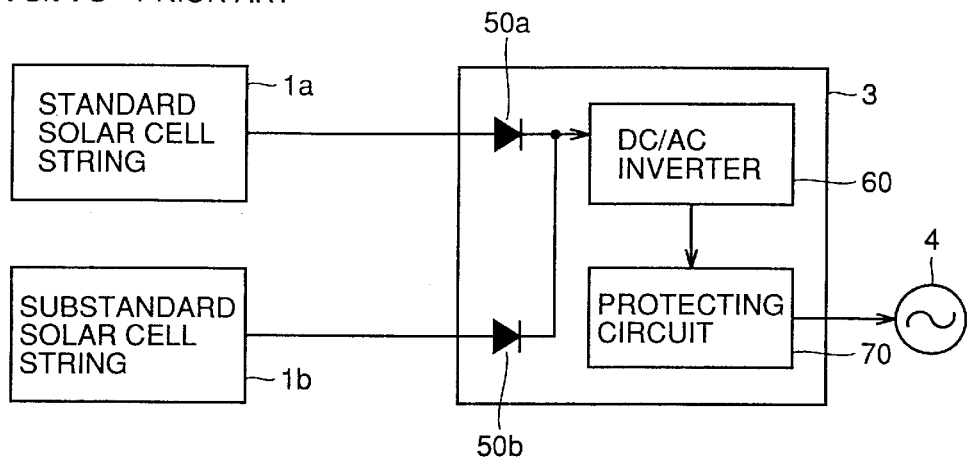
FIG. 15 is a block diagram representing a conventional solar generation system.
Figure 16A:
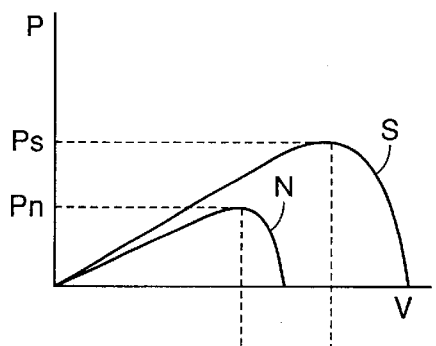
FIGS. 16A and 16B are graphs representing the output powers of the standard solar cell string and the substandard solar cell string shown in FIG. 15 and the output power when the output powers are connected in parallel.
Figure 16B:
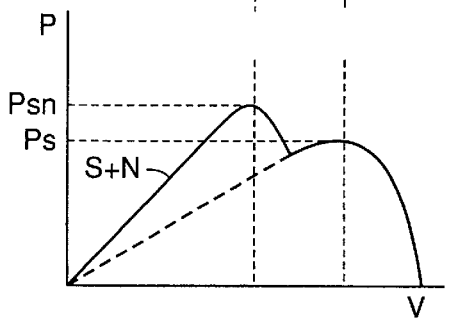

FIGS. 12A to 12C show appearance of the box containing the booster unit in accordance with one embodiment of the present invention. FIG. 12A is a front view, 12B is a side view and 12C is a bottom view. FIGS. 13A and 13b show internal structure of the box shown in FIGS. 12A to 12C. FIG. 13A is a front view with the cover of FIG. 12B removed, and FIG. 13B is a bottom view. FIGS. 14A and 14B show the structure of the lid member shown in FIG. 12A. FIG. 14A is a front view of the lid, and FIG. 14B is a cross section showing how the lid is attached.

Box 30 shown in FIGS. 12A to 12C accommodates booster unit 2 shown in FIG. 8 and, as shown in FIG. 12B, the box is placed vertically along a wall surface 40 outdoors. Box 30 includes a body portion 31 and a cover 32 covering the same. As shown in FIG. 13A, a barrier portion 33 serving as a drainage path is formed along the top and side surfaces in the body portion 31. Barrier portion 33 guides rain water penetrating between body portion 31 and cover 32 to a lower portion of body portion 31, and discharges the water to the outside through a rain outlet 34 as a discharge outlet, formed at the lower portion of body portion 31. Thus, conductive portions of boosting apparatus 3 and control circuit 15 accommodated in the body 30 placed outdoors are protected from rain water.

On the lower portion (right side of FIG. 12B) of body portion 31 of box 30, a heat sink 35 is attached. On heat sink 35, switching device 10 in boosting apparatus 3 and backflow preventing diodes 6a and 6b shown in FIG. 8 are attached, so that heat generated by the loss of switching device 10 in boosting apparatus 3 and by backflow preventing diodes 6a and 6b can be radiated to the outside, and thus radiation effect is improved.

Further, a metal plate 41 having a rectangular shape with one side opened is provided surrounding the heat sink 35. Inside the metal plate 41, a hook 42 is formed to hold the body portion 31. As metal plate 41 is attached to wall surface 40 and body portion 31 is held by hook 42, box 30 can be attached in the vertical direction along the wall surface 40. Metal plate 41 is formed to cover heat sink 35, so as to prevent burning by accidentally touching the heat sink 35 which is heated by the heat generated by the loss from backflow preventing diodes 6a and 6b as well as switching device 10 when boosting apparatus 3 is in operation.

There is an indicator unit 36 at the central portion of cover 32 of box 30. When boosting apparatus 3 is activated, indicator unit 36 is turned on, and when the operation of the apparatus stops, it turns off. Thus, whether booster unit 2 is in operation in the day time with much sunlight or not can be confirmed without the necessity to open the body of booster unit 2. For example, if the indicator unit is off in the day time, it can be noticed that boosting apparatus 3 is not in operation. Therefore, whether booster unit 2 operates normally or not can be confirmed by the indicator unit 36.

Further, a lid portion 37 is provided at a lower portion of cover 32 to cover an opening portion. When removed from body 31, the lid portion 37 allows operation of input breakers 8a and 8b mounted on the body 31, as shown in FIG. 13A. An attachment rail portion 38 is formed on one side of lid portion 37 as shown in FIG. 14A, and a fitting 39 is attached on the other side. A water proof member 45 such as rubber is adhered at the contact portion between lid portion 37 and body 31.

Fitting 39 has a fixing plate 391 and knob 392. When knob 392 is rotated, fixing plate 391 rotates and by this operation, it is possible to attach and detach the lid portion 37 to and from the body of booster unit 2. When lid portion 37 is opened, it is possible to operate input breakers 8a and 8b. Therefore, without the necessity to open the body of booster unit 2, input breakers 8a and 8b can be operated from the outside simply by opening lid portion 37. Further, no screw is used at the lid portion 37. Therefore, it is unnecessary to use a special tool to remove lid portion 37 from box 30. Therefore, it is possible to easily disconnect booster unit 2 and solar cell 1b or DC/AC inverter 60 in case of emergency, for example, and therefore safety of the overall system can be improved.

As described above, according to the present embodiment, a space for installation dedicated for interconnection inside and outside of a building is saved as regards the connection between the DC power source such as solar cell strings 1a and 1b with the booster unit 2 and the DC/AC inverter 60, the dedicated box 30 is integrated to reduce the cost of the overall apparatus, appearance inside and outside of the building is not spoiled as lines and wires for interconnection are reduced. Further, when booster unit 2 is in operation, overvoltage to DC/AC inverter 60 is prevented and generation of a short-circuit current in case of malfunction or short circuit of switching device 10 can be intercepted, thus a safe apparatus is realized.

Further, a boosting circuit boosting the DC power voltage, a backflow preventing circuit preventing backflow of current from the boosting means to the DC power source, an input connecting/disconnecting unit for connecting or disconnecting the DC power source to and from the boosting circuit, and a lightning surge preventing circuit preventing entrance of lightning surge from the DC power source to the boosting circuit are provided, so that backflow of current from the boosting apparatus and the inverter apparatus to the solar cell can be prevented and it is possible to safely connect or disconnect the solar cell and the boosting circuit and the boosting circuit and the inverter apparatus, at the time of engineering work, for example.

Further, entrance of lightning surge from the solar cell side to the boosting circuit and the inverter apparatus in case of thunderbolt can be prevented, and therefore safety of the inverter apparatus is ensured. Further, a DC power having the same DC voltage as that of standard solar cell string can be supplied even from a substandard solar cell string to the inverter apparatus, and therefore limited space of a building roof, for example, can be efficiently used.

Further, when the output voltage of the booster unit is lower than the upper limit set voltage, boosting circuit performs the control to make constant the boosting ratio, so that a DC power comparable to that of a standard solar cell string can be supplied from a substandard solar cell string to the inverter apparatus. Therefore, a limited space of a building roof, for example, can be efficiently utilized.

Further, when the output voltage of the booster unit is higher than the upper limit set voltage, the boosting circuit performs control to make constant the upper limit voltage, and therefore overvoltage to the inverter apparatus possibly causing a malfunction can be prevented.

When the boosting circuit is in operation in the day time with high amount of sunshine, control is performed to make constant the boosting ratio, and when the output voltage increases to be higher than the upper limit set voltage, the control to keep constant the boosting ratio is stopped and control is performed to keep constant the upper limit voltage by changing the boosting ratio, so that the output voltage does not exceed the upper limit. In this manner, overvoltage to the inverter apparatus possibly causing a malfunction can be prevented.

Further, trip signal generating circuit generates a trip signal when the output voltage becomes excessive, so that connection to the substandard solar cell string is opened by the opening circuit. While the booster unit is in operation in the day time with high amount of sunshine and control is performed to keep constant the boosting ratio or keep constant the voltage, the trip signal generating circuit trips and opens the circuit when an overvoltage is detected by the boosting circuit. Therefore, over voltage to the inverter apparatus possibly causing a malfunction can be prevented.

As to the trip function in the breaker, when the booster unit is in operation in the day time with high amount of sunshine, boosting circuit is short-circuited, a short-circuit current flows between the solar cell and the boosting circuit and the temperature of the boosting circuit increases, then the trip signal generating circuit generates a trip signal to open the circuit when the temperature increase is larger than the set value. Consequently, continuous flow of the short-circuit current is prevented, and hence malfunction of the booster unit caused by the short-circuit current can be prevented.

The boosting circuit includes a fuse for intercepting the short-circuit current from the output side. Therefore, when the inverter apparatus is short-circuited, the short-circuit current flows from the inverter apparatus to the booster unit and the short-circuit current flows in the circuit, the fuse operates to open the circuit and prevents continuous flow of the short-circuit current. Therefore, malfunction of the booster unit caused by the short-circuit current can be prevented.

The fuse is connected in series with the boosting circuit, and the path through which the short-circuit current flows is opened in accordance with the magnitude of the short-circuit current. Therefore, when the inverter apparatus is short-circuited and the short-circuit current flows from the inverter apparatus to the booster unit and the short-circuit current flows in the circuit, the fuse provided in the boosting circuit is blown off, opening the circuit. Thus, continuous flow of the short-circuit current can be prevented, and malfunction caused by the short-circuit current can be prevented.

Further, at least the input/output terminal is accommodated in a box placed outdoors, and the box includes a drainage path guiding the rain water to the lower portion when the rain water penetrates and a discharge outlet for discharging the rain water guided to the lower portion to the outside. Therefore, entrance of the rain water to the conductive portions of the inverter apparatus and the control circuit can be prevented. Further, as a dedicated box is formed integrally, the cost of the overall apparatus can be reduced.

Further, a radiator for generation of heat from the boosting circuit and the backflow preventing circuit to the outside is provided on the outside of the box. Thus, the effect of radiation can be enhanced.

Further, as a metal plate covering the radiator of the box and supporting the box on the wall surface is provided, possibility of burning by accidentally touching the radiator can be prevented and the box can be attached on a wall surface.

Further, a lid portion that can be opened is provided on the box, and by operating the input connecting/disconnecting unit with the lid opened, it is possible to separate the booster unit from the DC power source in case of emergency.

Further, an indicator means that turns off when the boosting circuit is driven and turns off when the operation of the boosting circuit stops is provided on the box. Therefore, it can be readily confirmed whether the boosting circuit is normally operating or not.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solar generation system boosting a DC voltage output from a solar cell and supplying the boosted DC voltage to an inverter apparatus converting the boosted DC voltage to an AC power, comprising:

a standard solar cell string having a standard number of solar cell modules connected in series;

a substandard solar cell string having solar cell modules smaller in number than said standard number connected in series;

a boosting circuit for boosting a DC voltage output from said substandard solar cell string to a value equal to a DC voltage output from said standard solar cell string; and an input connecting circuit supplying the DC voltage boosted by said boosting circuit and the DC voltage output from said standard solar cell string to said inverter apparatus, wherein said boosting circuit is provided detachable between said substandard solar cell string and said input connecting circuit.

2. The solar generation system according to claim 1, wherein said boosting circuit boosts the DC voltage output from said substandard solar cell string by a boosting voltage ratio determined by the ratio between said standard number and the number smaller than said standard number.

3. The solar generation system according to claim 2, further comprising a switch for manually switching the boosting voltage ratio of said boosting circuit.

4. The solar generation system according to claim 2, further comprising a control circuit controlling said boosting circuit by setting said boosting voltage ratio by pulse width modulation.

5. The solar generation system according to claim 1, comprising a plurality of said substandard solar cell strings; wherein said boosting circuit is provided for each of said plurality of substandard solar cell strings, and boosts the DC voltage output from the corresponding substandard solar cell string.

6. The solar generation system according to claim 1, wherein a power supply voltage is supplied from said standard solar cell string to said boosting circuit.

7. The solar generation system according to claim 1, wherein said input connecting circuit includes a backflow preventing circuit preventing backflow of a current from said boosting circuit to said substandard solar cell string, an input connecting and disconnecting circuit for connecting or disconnecting said substandard solar cell string to and from said boosting circuit, and a lightning surge preventing circuit for preventing entrance of lightning surge from said substandard solar cell string to said boosting circuit.

8. The solar generation system according to claim 1, further comprising a voltage control circuit for performing control to keep constant a boosting ratio, when output voltage from said boosting circuit is lower than an upper limit set voltage.

9. The solar generation system according to claim 8, wherein said voltage control circuit performs control to keep constant an upper limit voltage, when the output voltage from said boosting circuit is higher than the upper limit set voltage.

10. The solar generation system according to claim 8, wherein said voltage control circuit changes said boosting ratio.

11. The solar generation system according to claim 1, wherein said input connecting circuit includes
  a trip signal generating circuit for generating a trip signal in response to an output voltage being an overvoltage, and
  an opening/closing circuit responsive to the trip signal from said trip signal generating circuit for opening connection between said substandard solar cell string and said input connecting circuit.

12. The solar generation system according to claim 11, wherein said trip signal generating circuit generates the trip signal when said boosting circuit is short-circuited, so that connection between said substandard solar cell string and said input connecting circuit is opened by said opening/closing circuit.

13. The solor generation system according to claim 12, wherein said trip generating circuit outputs the trip signal when it is detected that a short-circuit current flows to said boosting circuit and temperature is increased.

14. The solar generation system according to claim 12, wherein said trip signal generating circuit generates the trip signal when output voltage of said boosting circuit exceeds a voltage range.

15. The solar generation system according to claim 1, wherein said boosting circuit includes a fuse for intercepting short-circuit current from an output side.

16. The solar generation system according to claim 15, wherein said fuse is connected in series with said boosting circuit, and opens a flow path of said short-circuit current in accordance with magnitude of said short-circuit current.

17. The solar generation system according to claim 1, further comprising a box to be placed outdoors, accommodating at least said input connecting circuit,
said box including a drainage path guiding rain water to a lower portion when the rain water penetrates, and a discharge outlet discharging the rain water guided to the lower portion to the outside.

18. The solor generation system according to claim 17, further comprising a radiator placed outside said box, for external generation of heat from said boosting circuit and said backflow preventing circuit.

19. The solar generation system according to claim 18, further comprising a metal plate covering the radiator of said box and supporting said box on a wall surface.

20. The solar generation system according to claim 19, wherein said box has a lid portion that can be opened/closed, and said input connecting circuit is operated by opening said lid.

21. The solar generation system according to claim 1, further comprising an indicator turned on when said boosting circuit is driven and turned off when operation of said boosting circuit is stopped.

* * * * *